United States Patent [19]

Morris

[11] B 3,917,677

[45] Nov. 4, 1975

[54] PRODUCTION OF CARBOXYLIC ACID ESTERS BY HYDROESTERIFICATION

[75] Inventor: Donald E. Morris, Kirkwood, Mo.

[73] Assignee: Monsanto Company, St. Louis, Mo.

[22] Filed: May 17, 1972

[21] Appl. No.: 254,211

[44] Published under the Trial Voluntary Protest Program on January 28, 1975 as document no. B 254,211.

[52] U.S. Cl. ....... 260/497 A; 260/410; 260/410.9 R; 260/410.6; 260/410.7; 260/468 M; 260/476 R
[51] Int. Cl.² ............................................ C07C 67/38
[58] Field of Search .. 260/410.9 R, 497 B, 533 AN, 260/604 HF, 468 M

[56] References Cited
UNITED STATES PATENTS

| | | | |
|---|---|---|---|
| 2,995,575 | 8/1961 | Schulz et al. | 260/343.5 |
| 3,040,090 | 6/1962 | Alderson et al. | 260/483 |
| 3,102,899 | 9/1963 | Cannell | 260/439 |
| 3,168,553 | 2/1965 | Slaugh | 260/497 |
| 3,641,074 | 2/1972 | Fenton | 260/410.9 |
| 3,641,076 | 2/1972 | Booth | 260/429 R |
| 3,646,079 | 2/1972 | Lawrenson | 260/429 J |
| 3,660,493 | 5/1972 | Johnson et al. | 260/604 HF |
| 3,668,249 | 6/1972 | Fenton | 260/546 |
| 3,733,362 | 5/1973 | Biale | 260/604 HF |

OTHER PUBLICATIONS

Du Pont et al., Bull. Soc. Chim., France (1948), 529–532.

*Primary Examiner*—Lewis Gotts
*Assistant Examiner*—Diana G. Rivers

[57] ABSTRACT

The present invention relates to an improved process for the preparation of carboxylic acid esters specifically by the reaction of ethylenically unsaturated compounds with carbon monoxide and alcohols, in the presence of a catalyst solution essentially comprising a rhodium component and a tertiary organophosphorus component; the said solution being essentially free of halogen.

6 Claims, No Drawings

PRODUCTION OF CARBOXYLIC ACID ESTERS BY HYDROESTERIFICATION

This invention relates to an improved process for the preparation of carboxylic acid esters. More particularly it relates to processes employing improved catalyst solutions for the reaction of ethylenically unsaturated compounds with carbon monoxide and alcohols to yield carboxylic acid esters. More specifically, the said improved catalyst solutions are essentially comprised of rhodium components and tertiary organo-phosphorus modifiers. The catalyst solutions are substantially free of halogen, including coordinated and free halogens. The present catalyst solutions are also selective in that they carbonylate the said unsaturated compounds, but not the alcohols.

Processes for the preparation of carboxylic acid esters from olefins, and other ethylenically unsaturated compounds, carbon monoxide, and alcohols are well known in the art. The prior art teaches the use of a number of catalysts for the synthesis of carboxylic acid esters by reaction of olefins with carbon monoxide and alcohols at elevated temperatures and pressures.

Catalysts such as salts and carbonyls of nickel and cobalt, especially halides; and in general the Group VIII metals, and simple salts, carbonyls and complexes; have been reported to function for the production of carboxylic acid esters by reaction of olefins and carbon monoxide in the presence of alcohols at temperatures from 30° to 375°C and pressures up to 3,000 atmospheres. However, even under such severe conditions the yields of esters were substantially poor, and therefore uneconomical. Somewhat less severe reaction conditions of temperature and/or pressure has been reported in the prior art employing specific catalyst compositions, e.g., 180°C and 190 atmospheres in the presence of $Co_2(CO)_8$ promoted by pyridine and hydrogen; 75°C to 250°C and 55 to 205 atmospheres in the presence of $Co_2(CO)_8$ and tributylphosphine; or 85°C to 250°C and 100 to 1,000 atmospheres in the presence of palladium phosphine complex catalysts promoted by hydrohalic acids. Even using the prior art specific catalyst compositions and reaction conditions, substantially poorer yields of the desired carboxylic acid ester product and substantially slower reaction rates are obtained than those achieved in the process of this invention.

The prior art (U.S. Pat. No. 3,168,553) teaches the use of a large variety of cobalt, ruthenium, rhodium, and iridium compounds and complexes as catalysts for the carbonylation of olefins in the presence of a variety of active hydrogen-containing compounds such as acids, water, alcohols, amines, etc. to yield a variety of carbonyl derivatives. However, quite unexpectedly, a class of rhodium compounds described herein has been discovered which exhibit superior activity and selectivity over that of the prior art cobalt, ruthenium, and iridium compounds, specifically for the reaction of olefins, carbon monoxide, and alcohols to yield esters. Furthermore, the catalysts of the present invention exhibit superior activity, selectivity, and handling properties, i.e. lack of corrosivity, halide volatility, etc., over that of halide-containing rhodium catalysts described in the prior art, e.g. $RhCl_3$, for the hydroesterification of olefins to esters. One disadvantage of certain of the hydroesterification processes described in the prior art is that they employ a halide-containing catalyst component. More specifically, many prior art catalyst systems contain a Group VIII metal halide or a halide promoter, i.e., $Cl^-$, $Br^-$, or $I^-$ present as salts, free halogen or hydrohalic acids. The presence of these halides in these prior art catalyst systems, however, has been found in some circumstances to lead to the formation of the volatile and highly corrosive hydrogen halides and alkyl halides derived from the reaction of these halides with the olefin alcohol or water reactants in the course of the reaction. These halogen-containing systems, therefore, require expensive corrosion-resistant alloys in the construction of the reaction vessels and distillation equipment. A further disadvantage of these prior art halide-containing catalyst systems is that upon distillation of the reaction product, the volatile hydrogen halides, halogens and alkyl halides derived from the reactions also distill away from the metal catalyst systems. Consequently, recovery systems have to be devised to allow the recycling of these expensive halide components to the reaction vessel. The problems seriously detract from the usefulness of the catalyst systems in processes described in the prior art.

Another disadvantage of the halide-containing catalyst systems described in the prior art for hydroesterification processes is their lack of activity in the absence of a buffer, e.g. sodium acetate. The necessary presence of these buffers leads to the formation of solid materials, e.g. when using methanol as a solvent, it is found that sodium monomethylcarbonate precipitates, which creates serious handling problems with these reaction mixtures. Thus, the pumping of catalyst mixtures which contain substantial amounts of insoluble material, especially recycling streams, seriously detract from the usefulness of the catalyst systems in processes described in the prior art.

Other hydroesterification processes, e.g., those employing cobalt complexes $Co_2(CO)_8$, which have been described in the prior art and do not contain halide or halogen components must be carried out at very high pressures in order to maintain the activity and stability of the catalyst. These catalyst systems, employing high pressures and expensive high-pressure vessels are also characterized by the formation of large proportions of by-products. For these reasons, the cobalt-catalyzed processes are considerably less effective than is the present invention.

It is, therefore, an object of the present invention to overcome the above disadvantages and thus provide an improved and more economically and commercially feasible hydroesterification process for the production of carboxylic acid esters from ethylenically unsaturated compounds in the liquid phase.

Another object of this invention is to provide a more reactive hydroesterification catalyst composition than has been heretofore described in the prior art.

Still another object of the present invention is to provide a more selective hydroesterification catalyst composition which results in the production of a higher yield of the desired carboxylic acid ester with lower yield of aldehydes, alcohols, ketones, aldols, undesired esters, carbon dioxide, paraffinic hydrocarbons, hydrogen, and other undesirable by-products.

Another object of the present invention is the provision of an improved hydroesterification process enabling the efficient and selective production of carboxylic acid esters by reaction of ethylenically unsaturated compounds with carbon monoxide and alcohol in the presence of an improved catalyst, thus enabling the use of lower catalyst concentration, lower temperature, lower pressure, and shorter contact time than has been generally possible heretofore and facilitating product isolation, catalyst recovery and recycle without substantial catalyst loss, specifically loss of halogen. The present catalyst may be employed using a solution of the catalyst in a batch-type process or in a continuous process.

As discussed above, it has now been found quite unexpectedly that certain rhodium complexes and compounds function as catalysts for the selective hydroesterification of olefins in the absence of any halide whatsoever. The present rhodium catalysts are not only active and stable in the absence of halides, but have the further advantage that they show no tendency to form corrosive or volatile derivatives in the reaction. In the present process, conducted with alcohols present in the feed, it has been found that the carbonylation of the alcohols is completely repressed.

In accordance with the present invention, ethylenically unsaturated compounds are converted selectively to carboxylic acid esters, by reaction in the liquid phase with carbon monoxide, and alcohol at temperatures from about 50° to 300°C, preferably 125° to 225°C and at partial pressures of carbon monoxide from 1 psia to 15,000 psia, preferably 100 psia to 1,500 psia, in the presence of an improved catalyst solution comprised of a rhodium component and a tertiary organophosphorus component having from 3 to 90 carbon atoms, the said solution being substantially free of halogen.

As referred to above, the improved catalyst solutions are comprised essentially of rhodium in complex combination with carbon monoxide and a modifier component comprising a tertiary organophosphorus compound. Halide or halogen promoter components are undesirable for these catalyst systems, since they create separation and corrosion problems as discussed above. In addition, these non-halide containing catalyst sytems are more active and more selective than prior art hydroesterification catalysts.

In order to completely eliminate the halide, the rhodium component of the catalyst is preferably introduced into the reaction mixture as a salt or a complex which does not contain halide. Rhodium compounds which may be used as catalyst precursors include:

$Rh(NO_3)_3 \cdot 2H_2O$
$Rh_2(SO_4)_3 \cdot H_2O$
$Rh(ClO_4) \cdot 3H_2O$
$Rh_2O_3 \cdot 5H_2O$
$Rh(C_5H_7O_2)_3$ where $C_5H_7O_2$ = acetylacetonato
$Rh_2(OAc)_4$ where OAc = acetato
$Rh(C_5H_7O_2)(CO)_2$
$Rh(OPr)(CO)[(C_3H_7)_3P]_2$ where OPr = propionato
$[(C_6H_5)As][Rh(OAc)_2(CO)_2]$
$(C_5H_5)Rh(CO)_2$ where $C_5H_5$ = cyclopentadienyl
$Rh(C_3H_6NS_2)(CO)_2$ where $C_3H_6NS_2$ = N,N-dimethyldithiocarbamato
$Rh(C_{15}H_{11}O_2)_2OAc$ where $C_{15}H_{11}O_2$ = bis-benzolymethanato
$Rh(C_5HO_2F_6)(CO)_2$ where $C_5HO_2F_6$ = hexafluoroacetylacetanato
$K_3[Rh(C_2O_4)_3]$ where $C_2O_4$ = oxalato
$K_3[Rh(C_3H_2O_4)_3]$ where $C_3H_2O_4$ = malonato
$Rh(C_{12}H_{21}O_2)(CO)_2$ where $C_{12}H_{21}O_2$ = nonanoylacetanato
$Rh(C_9H_{15}O_2)(CO)_2$ where $C_9H_{15}O_2$ = bis-butyroylmethanato
$Rh_4(CO)_{12}$
$Rh_6(CO)_{16}$
$Rh_2(CO)_8$
$[Rh(OAc)(CO)_2]_2$
$[Rh(OBz)(CO)_2]_2$ where OBz = benzoato
$Rh_2(CF_3COO)_4$ where $CF_3COO$ = trifluoroacetato
$Rh(C_5H_{10}NS_2)_3$ where $C_5H_{10}NS$ = N,N-dimethyldithiocarbomato
$Rh(SCN)_3 \cdot H_2O$
$Rh(C_3H_5)_3$ where $C_3H_5$ = allyl
$[Rh(CNC_6H_5)_4]PF_6$ This list is not intended to limit, but to illustrate possible catalyst precursors which do not contain halide.

The preferred catalyst precursors are those containing diketonates or carboxylates. The diketonates have the general formula

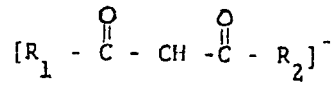

where $R_1$ — and $R_2$ — can be either alkyl or aryl radicals containing from 1 to 20 carbon atoms. In addition, they may contain substituent groups, e.g., fluoro, in place of any or all of the hydrogen atoms. In complexes containing these ligands, the diketonate is chelated to the metal via each of the oxygen atoms, thus forming a six-membered ring.

The carboxylates have the general formula

where $R^-$ can be either alkyl or aryl radicals containing from 1 to 20 carbon atoms. Again these hydrocarbon radicals may contain substituent groups, as shown above, in place of any or all of the hydrogen atoms. These ligands are mono-coordinately bound to the central metal through one of the oxygen atoms.

It is possible to use metal compounds composed of di- or tri-carboxylate groups as counter-ions or ligands. In these cases, the carboxylates may be forming chelate rings with the metal.

Another type of non-halide anionic ligand (or counter-ion) which may be utilized in this invention is N,N-dialkyldithiocarbamates. They have the general formula

where $R_1$ and $R_2$— can be alkyl or aryl radicals containing from 1 to 20 carbon atoms.

The modifier component of the catalyst system may be a tertiary organophosphorus compound having the following general formula: $(R_1)(R_2)(R_3)P$ when $R_1$, $R_2$, and $R_3$ are the same or different alkyl radicals containing from 1 to 30 carbon atoms or aryl radicals containing from 6 to 30 carbon atoms. Consequently, the tertiary alkyl-containing radicals have from 3 to 90 carbon atoms, and those containing aryl radicals have from 18 to 90 carbon atoms. The alkyl radicals are preferred. Each of the organo moieties is monovalently bonded to the trivalent phosphorus through a carbon atom. The organo moieties can also contain other substituents such as cyano and halo. The described organophosphorus compounds all have available one unshared pair of electrons on the phosphorus atom which is capable of forming a coordinate bond with the rhodium. The tertiary compounds are preferred, although the equivalent secondary and primary compounds may also be employed.

Examples of suitable tertiary organophosphorus compounds include triphenylphosphine, tributylphosphine, and tri(p-toly)-phosphine. The molar proportions of the organophosphorus component relative to the rhodium component can be 100:1 to 1:1. The preferred range is 5:1. to 2:1. The remaining coordination sites of the rhodium are substantially occupied by carbon monoxide. While the present invention is not limited to any formulae; carboxylato, diketonato, and other non-halide anionic ligands may also be coordinated.

The present catalyst compositions containing the necessary rhodium and organophosphorus components may be based upon precursor compounds which are comprised of the rhodium component and the organophosphorus component as a ligand, e.g. $Rh(OPr)(CO)[(C_3H_7)_3P]_2$. However, the necessary rhodium and organophosphorus components may also be provided from individual compounds which are supplied to the catalyst solution, e.g. $Rh_2(OAc)_4$ and $(C_3H_7)_3P$.

In order to provide the present catalyst solutions essentially comprising a rhodium component and an organophosphorus component, it is also desirable to have a liquid solvent present. The solvent employed may be a non-acidic, neutral or basic solvent which is compatible with the improved catalyst. Examples include alcohols, esters, lactones, water, pure olefins, paraffins, ethers, nitriles, substituted amides, sulfoxides, or mixtures thereof. The alcohols which can be employed include primary and secondary alcohols of 1 to 20 carbon atoms, primary polyols from 1 to 20 carbon atoms, and etheric mono- and poly-ols from 1 to 20 carbon atoms. Representative alcohols which can be used include: methanol, ethanol, propanol, iso-propanol, hexanols, didecanols, stearyl alcohol, ethylene glycol, glycerine, pentaerythritol, cyclohexanol, 2-methoxyethanol, diethylene glycol, and triethylene glycol. The primary alcohols are preferred.

The solvent should not contain free acids such as carboxylic acids, sulfonic acids, sulfinic acids, etc. since an acidic medium renders the improved catalyst ineffective.

In accordance with the invention olefin and carbon monoxide are reacted with alcohols in the presence of the above catalysts to form esters. For example, by reacting ethylene with carbon monoxide and methanol in the presence of a catalytic material already described herein, methyl propionate is formed (also a small amount of diethylketone).

Examples of suitable ethylenically unsaturated compounds which can be used as feedstocks in this invention include ethylene, propylene, butene-1, butene-2, hexenes, octenes, dodecenes, hexadecenes, 2-methylpropene, cyclohexene, methylcyclohexene, styrene, methylstyrene, 3,3-dimethyl-1-butene, 2-phenylbutene, 2-cyclohexylbutene, and mixtures thereof. Preferred compounds are those having from 2 to 12 carbon atoms, while ethylene and propylene are the most preferred feedstocks.

The reaction rate is dependent upon catalyst concentration and temperature. Concentrations of the metal compound of the catalyst system in the liquid phase, between $10^{-6}$ moles/liter and $10^{-1}$ moles/liter, are normally employed, with the preferred range being $10^{-3}$ moles/liter to $10^{-1}$ moles/liter. Higher concentrations even to the extent of 1 mole/liter may, however, be used if desired. Higher temperatures also favor high reaction rates.

The following examples illustrate specific embodiments of the invention, but are not limitative of the scope thereof.

EXAMPLE 1

A batch reactor is charged with the following ingredients: 0.206g (0.8 mole) acetylacetonatodicarbonylrhodium(I), $Rh(acac)(CO)_2$, as the catalyst precursor, 0.404g (2.0 mmole) of tributylphosphine as the organophosphorus component, and 80 ml of methanol as the solvent and reactant.

The reactor is pressured to 50 psig with carbon monoxide and then heated to 175°C. After reaching this temperature, the reactor is pressured to 700 psig with a 50/50 mole percent $CO/C_2H_4$ gas blend. The reaction is carried out at constant pressure by feeding the gas blend from a high pressure reservoir into the reactor. During the reaction time of 4 hours, ca. 2870 psig. of feed gas is consumed.

The reaction mixture is subsequently analyzed by gas chromatography, indicating
- 42 wt. percent unreacted methanol
- 44 wt. percent methyl propionate
- 3 wt. percent diethylketone
- 2 wt. percent methyl formate
- 8 wt. percent by-products which include methyl isobutyrate, methyl 2-methylpentanoate, propanal, 2-methylpentene-2-al.

The selectivity to methylpropionate and diethylketone is 80 percent and 6 percent respectively.

When the above rhodium component is substituted by other rhodium components such as the following similar products are obtained:
- $\mu,\mu$-diacetatotetracarbonyldirhodium(I)
- propionatocarbonylbis(tripropylphosphine)rhodium(I)
- acetatocarbonylbistriphenylphosphinerhodium(I)
- N,N-dimethyldithiocarbamatodicarbonylrhodium(I)

EXAMPLE 2

A batch reactor is charged with the following ingredients: 0.206g (0.8 mmole) of acetylacetonatodicarbonylrhodium(I), $Rh(acac)(CO)_2$ as the catalyst precursor, 0.404g. (2.0 mmole) of tributylphosphine as the organophosphorus component, and 80 ml of methanol as the solvent and reactant.

The reactor is flushed with nitrogen and then charged with 16.8 g(0.4 mole) of propylene. After heating to the reaction temperature, 175°C, the reactor is pressured to 700 psig. with carbon monoxide. The reaction is carried out at constant pressure by feeding carbon monoxide from a high pressure reservoir into the reactor. During the reaction time of 21 hours, ca. 1020 psig. of feed gas is consumed.

The reaction mixture is subsequently analyzed by gas chromatography indicating
- 71 wt. percent unreacted methanol
- 18 wt. percent methyl butyrate esters
- 2 wt. percent methyl formate
- 8 wt. percent by-products which include n- and isobutanol.

The methyl butyrate esters obtained have a normal/iso molar ratio of ca. 45:55. It is noted that the present method makes it possible to achieve high proportions of iso-products relative to normal products. This may be desired for example in the manufacture of methyl isobutyrate which is an intermediate for the preparation of methacrylates, e.g. methyl methacrylate.

With propylene as with ethylene (Example 5), the analogous iridium compounds are found to be inferior to the rhodium catalyst.

EXAMPLE 3

A batch reactor is charged with the following ingredients: 0.206 g.(0.8 mmole) of acetylacetonatodicarbonylrhodium(I), $Rh(acac)(CO)_2$, as the catalyst precursor, 0.404 g. (2.0 mmole) of tributylphosphine as the organophosphorus component, and 55 ml of methanol as the solvent and one of the reactants.

The reactor is pressured to 50 psig with carbon monoxide and heated to 175°C. After reaching this temperature 25 ml (0.2 mole) of hexene-1 is pressure-injected into the reactor from a separate charge pot. The pressure is raised to 700 psig with carbon monoxide. As the reaction proceeds, carbon monoxide is absorbed from the reactor head gases. The reactor pressure is maintained at 700 psig by feeding carbon monoxide from a high pressure reservoir. During the reaction time of 30 minutes 270 psig of feed gas is consumed.

The reaction mixture is subsequently analyzed by gas chromatography, indicating 11 percent unreacted hexene
73 percent unreacted methanol
7 percent methyl heptanoate esters
2 percent methyl formate
8 percent by-products which include $C_7$-alcohols.

The methyl heptanoate esters obtained have a normal to branched molar ratio of 60:40.

When this example is repeated with molar equivalents of respectively ethanol or propanol, instead of methanol, as the reacting solvent, the respective products are ethyl heptanoate and propyl heptanoate. Similarly, when the hexene olefin is substituted by pentene, or dodecene, the respective products are methyl hexanoate esters or methyl tridecanoate esters.

EXAMPLE 4

This example shows the effect of halides such as chlorides in influencing the course of the hydroesterification reaction. The procedure is similar to that of Example 1.

The last test also shows the effect of halide on these catalysts. The catalyst of test 1 which is exceedingly active is modified by adding halide, with a resultant serious decline in activity and selectivity. It can be seen that the rate and selectivity of this modified catalyst approach that of $RhCl_3$ (test 2 of this example).

A similar deleterious effect of the presence of halogen is found in the hydroesterification of propylene.

EXAMPLE 5

This example shows the effect of various metal precursors on the rate and selectivity of the hydroesterification reaction. The superiority of the rhodium catalysts over the iridium, cobalt, palladium, ruthenium, and osmium catalysts can be seen. Also a comparison of tests 1, 2 and 3 shows how the activity of rhodium catalysts diminishes as the chloride:rhodium ratio increases. The procedure is similar to that of Example 1.

EFFECT OF METAL ETHYLENE HYDROESTERIFICATION
$[Metal]_o = 0.02$ M., $[Bu_3P] = 0.05$ M., $[NaOAc]_o = 0.30$ M., Temp. = 175°C,
Gas Feed = 50/50 Mole % $CO/C_2H_4$, Total Pressure = 700 psig,
Volume of methanol initially = 80 ml

| Catalyst | Max. Rate (M/1-hr.) | Selectivity to | |
|---|---|---|---|
| | | MeOPr | DEK |
| $Rh(CO)_2acac$ | 2.2 | 65 | 15 |
| $[Rh(CO)_2Cl]_2$ | 1.1 | 44 | 36 |
| $RhCl_3$ | 0.2 | 38 | 43 |
| $Ir(CO)_2acac^1$ | very slow | 10 | 0 |
| $IrCl_3$ | very slow | 0 | 0 |
| $Pd(Ph_3P)_2Cl_2$ | 0 | 0 | 0 |
| $Pd(OAc)_2$ | 0 | 0 | 0 |
| $(NH_4)_2OsBr_6$ | 0 | 0 | 0 |
| $Co_2(CO)_8$ | very slow | 9 | 17 |
| $RuCl_3$ | very slow | 13 | 0 |
| $Rh_2(OAc)_4$ | 1.5 | 76 | 19 |

[1]Temp. = 195°C

EXAMPLE 6

This example shows the effect of various modifier components in the catalyst system. The procedure is similar to that of Example 2. The following table summarizes the results, which are then discussed below.

EFFECT OF CHLORIDE ON ETHYLENE HYDROESTERIFICATION
$[Rh]_o = 0.01$ M, $[Bu_3P] = 0.025$ M, Temp. = 175°C,
Gas Feed = 50/50 mole% $CO/C_2H_4$, Total Pressure = 700 psig,
Volume of methanol initially = 80 ml

| Catalyst | $[NaOAc]_o$ (M/1) | $[Bu_4NCl]_o$ (M/1) | Max. Rate (M/1-hr) | Selectivity to | |
|---|---|---|---|---|---|
| | | | | MeOPr | DEK |
| $Rh(CO)_2acac$ | 0 | 0 | 4.8 | 80% | 6% |
| $RhCl_3$ | 0.30 | 0 | 0.1 | 38% | 43% |
| $RhCl_3$ | 0 | 0 | 0 | 0% | 0% |
| $Rh(CO)_2acac$ | 0 | 0.03 | 0.1 | 37% | 40% |

The first test of this example shows that the most active and selective catalyst system is one free of halide and sodium acetate (the acetylacetonate moiety does not provide acetate ions).

The next two tests, viz. with $RhCl_3$ as the catalyst precursor, show that the presence of chloride in the catalyst system, regardless of whether sodium acetate is present or not, generates a catalyst which is less active and has poorer selectivities to methyl propionate.

EFFECT OF MODIFIER COMPONENT ON PROPYLENE HYDROESTERIFICATIONS
$[Rh(CO)_2acac]_o = 0.01$ M, $[Modifier]_o = 0.025$ M,
Temp. = 175°C, Gas Feed = 100% CO, Total Pressure = 700 psig
Volume MeOH = 80 ml, $C_3H_4$ charge~0.3 mole

| MODIFIER | Max. Rate (M/1-hour) | Selectivity to | |
|---|---|---|---|
| | | Methyl butyrates | (%normal) |
| None | 0 | 0 | 0 |
| $Bu_3P$ | 3.2 | 69% | (42%) |
| $(BuO)_3P$ | 0 | 0 | 0 |
| $(C_8H_{17})_3P$ | 7.4 | 65% | (47%) |

-continued

EFFECT OF MODIFIER COMPONENT ON PROPYLENE HYDROESTERIFICATIONS

$[Rh(CO)_2acac]_0 = 0.01$ M, $[Modifier]_0 = 0.025$ M,
Temp. = 175°C, Gas Feed = 100% CO, Total Pressure = 700 psig
Volume MeOH = 80 ml, $C_3H_4$ charge~0.3 mole

| MODIFIER | Max. Rate (M/l-hour) | Selectivity to Methyl butyrates | (%normal) |
|---|---|---|---|
| $Et_2PhP$ | 1.2 | 55% | (36%) |
| $(C_2H_5)_3P$ | 4.8 | 67% | (45%) |
| $(C_{20}H_{41})_3P$ | 5.7 | 67% | (49%) |
| $(C_6H_{11})_3P$ | 5.0 | 69% | (43%) |
| $BuPh_2P$ | 0.4 | 45% | (34%) |
| $Ph_3P$ | 0.08 | 30% | (36%) |
| $Bu_3As$ | 0 | 0 | 0 |
| $C_5H_5N$ | 0 | 0 | 0 |

The trialkylphosphine compounds result in hydroesterification catalysts which are more active and selective than those produced from triarylphosphine compounds. Phosphites, e.g. tributylphosphite; amines, e.g. pyridine; and arsines e.g. tributylarsine, are ineffective modifiers for these catalysts. In addition, the rhodium precursors, e.g. $Rh(CO)_2acac$, are also ineffective in the absence of modifiers. The use of ethylene instead of propylene feed leads to similar results.

EXAMPLE 7

This following table illustrates the effect the sodium acetate concentration has on the process of Example 2. The procedure is similar to that of Example 2.

EFFECT OF SODIUM ACETATE CONCENTRATION OF PROPYLENE HYDROESTERIFICATION

$[Rh(CO)_2acac]_0 = 0.02$ M, $[Bu_3P]_0 = 0.05$ M, Temp. = 175°C,
Gas Feed = 100% CO, Total Pressure = 700 psig
Volume MeOH = 80 ml, $C_3H_6$ charge~0.4 mole

| $[NaOAc]_0$ (M/l) | Max. Rate (M/l-hr) | Solids Present | Selectivity[1] to Methyl butyrates | (%normal) |
|---|---|---|---|---|
| 0.3 | 5.9 | Yes | 70% | (35%) |
| 0.10 | 7.7 | Yes | 76% | (44%) |
| 0.05 | 8.6 | Yes | 72% | (45%) |
| 0 | 14.1 | No | 72% | (52%) |

[1] Major by-products include n- and iso-butanol

This series of tests shows that sodium acetate is unnecessary in the present reaction. However, when using a metal halide as the catalyst precursor, e.g. $RhCl_3$, a buffer such as sodium acetate is necessary and results in the formation of undesirable solid materials, e.g. sodium monomethylcarbonate.

EXAMPLE 8

The following example is included to illustrate the effect the phosphine:rhodium ratio has on the selectivity and activity of the ethylene hydroesterification reaction. The procedure is similar to that of Example 1.

EFFECT OF $Bu_3P$:Rh RATIO ON ETHYLENE HYDROESTERIFICATION

$[Rh(CO)_2acac] = 0.01$ M, Temp. = 175°C, Gas Feed = 50/50
Mole % $CO/C_2H_4$, Total Pressure = 700 psig, Volume MeOH=80 ml.

| $[Bu_3P]$ (M/l) | P:Rh | Max. Rate (M/l-hr.) | Selectivity to MeOPr | DEK |
|---|---|---|---|---|
| 0 | 0:1 | 0.03 | 25% | 65% |
| 0.01 | 1:1 | 0.2 | 0% | 32% |
| 0.02 | 2:1 | 2.1 | 65% | 18% |
| 0.025 | 2.5:1 | 4.8 | 80% | 6% |
| 0.03 | 3:1 | 7.8 | 71% | 17% |
| 0.05 | 5:1 | 7.5 | 75% | 5% |
| 0.10 | 10:1 | 0.9 | 35% | 16% |
| 0.20 | 20:1 | 0.5 | 23% | 59% |

[1] Major products include propanol

It is obvious from this table that the optimum activity and selectivity to methyl propionate occur in a range of phosphine: rhodium ratios from 2:1 to 5:1.

A similar dependence of the activity and methyl butyrate selectivity on the phosphine:rhodium ratio is observed with propylene hydroesterification. This is shown in the table below. The procedure is similar to that of Example 2.

EFFECT OF $Bu_3P$:Rh RATIO ON PROPYLENE HYDROESTERIFICATION

$[Rh(CO)_2acac]=0.02$, $[NaOAc]_0 = 0.30$ M, Temp. = 175°C,
Gas Feed = 100% CO, Total Pressure = 700 psig, Volume MeOH = 80 ml.

| $[Bu_3P]$ (M/l) | P:Rh | Max. Rate (M/l-hr.) | Sel. to MeOBu | n-butyrate iso-butyrate |
|---|---|---|---|---|
| 0 | 0:1 | 0 | 0 | |
| 0.02 | 1:1 | 0.7 | 48% | 32:68 |
| 0.04 | 2:1 | 4.8 | 68% | 41:59 |
| 0.05 | 2.5:1 | 5.9 | 70% | 35:65 |
| 0.06 | 3:1 | 5.3 | 51% | 34:66 |
| 0.10 | 5:1 | 2.5 | 44% | 35:65 |

It may also be seen that the ratio of normal:iso butyrates produced in this reaction vary only slightly with the phosphine: rhodium ratio.

EXAMPLE 9

The following example is included to illustrate the effect the solvent has upon the ethylene hydroesterification reaction. The procedure is similar to that of Example 1.

EFFECT OF SOLVENT ON ETHYLENE HYDROESTERIFICATION

$[Rh(CO)_2acac] = 0.01$ M, $[Bu_3P] = 0.025$ M, Temp. = 175°C,
Gas Feed = 50/50 Mole % $CO/C_2H_4$, Total Pressure = 700 psig.

| Solvent (Vol. ml) | Max. Rate (M/l-hr.) | MeOPr Yield (gms.) | DEK Yield (gms.) |
|---|---|---|---|
| MeOH (80) | 4.8 | 44 | 3 |
| butyrolactone (70)+$H_2O$(10) | 5.6 | 0[a] | 4 |
| Acetic Acid (76)+$H_2O$(4) | 0 | 0 | 0 |
| MeOPr (60)+$H_2O$(20) | 0 | 0[a] | 0 |
| MeOPr (60)+MeOH(20) | 0.2 | very small | 0.8 |

[a] Major products were hydroformylation products e.g. propanol> methyl-α-methylpentanal, et. al.

The catalyst system of the present invention is not effective in carboxylic acid solvents. Contact of the reactant alcohols with carboxylic acids at the reaction temperatures generates esters and water. It is not possible to hydroesterify or carboxylate ethylene in the resulting reaction mixture.

It is also not possible to carboxylate ethylene to propionic acid in a neutral solvent, e.g., butyrolactone, using the catalyst system of the present invention. Instead the major products are those resulting from hydroformylation of the ethylene, viz., propanol.

Thus it is advantageous to carry out the hydroesterification process in a solvent system which contains a high concentration of the reactant alcohol but which does not contain carboxylic acid or water.

EXAMPLE 10

A batch reactor is charged with the following ingredients: 0.206 g (0.8 mmole) acetylacetonatodicarbonylrhodium(I), Rh(acac)(CO)$_2$, as catalyst precursor, 0.404 g (2.0 mmole) of tributylphosphine as the organophosphorus component, and 80 ml of triethylene glycol as the solvent and reactant.

The reactor is flushed with nitrogen and then charged with 13.7 g (0.33 mmole) of propylene. After heating to the reaction temperature, 175°C, the reactor is pressured to 700 psig with carbon monoxide. The reaction is carried out at a constant pressure by feeding carbon monoxide from a high pressure reservoir into the reactor. During the reaction time of 18 hours, ca. 800 psig of feed gas is consumed.

The reaction mixture is subsequently analyzed by gas chromatography indicating the synthesis of 15 g. of triethyleneglycolbutyrate ester.

When this experiment is repeated with diethylene glycol and propylene, the product is composed of diethyleneglycolbutyrate esters.

I claim:

1. In a process for the production of carboxylic acid esters, wherein an ethylenically unsaturated hydrocarbon having from 2 to 30 carbon atoms is reacted with carbon monoxide and a primary or secondary alcohol at a temperature of 50°C to 300°C and at partial pressures of carbon monoxide from 100 psia to 1,500 psia, the improvement which comprises contacting the said reactants in the presence of a solution, essentially comprising (1) a member of the class consisting of acetylacetonatodicarbonylrhodium(I), $\mu,\mu,$-diacetatotetracarbonyldirhodium(I), propionatocarbonylbis(tripropylphosphine)rhodium(I), acetatocarbonylbistriphenylphosphinerhodium(I), tetraacetatodirhodium(II), or N,N-dimethyldithiocarbamatodicarbonylrhodium(I) and (2) a tertiary organophosphorus component having from 3 to 90 carbon atoms, the said solution being substantially free of halogen.

2. Process as in claim 1 in which the organophosphorus component is provided by a tertiary alkyl phosphine in which the alkyl radicals have from 1 to 30 carbon atoms.

3. Process as in claim 1 in which the molar ratio of the organophosphorus component to the rhodium component is in the range of 100:1 to 1:1.

4. Process as in claim 1 in which the alcohol is ethanol.

5. Process as in claim 1 in which the ethylenically unsaturated hydrocarbon is ethylene.

6. Process as in claim 1 in which the ethylenically unsaturated hydrocarbon is propylene.

* * * * *